Figure 1:
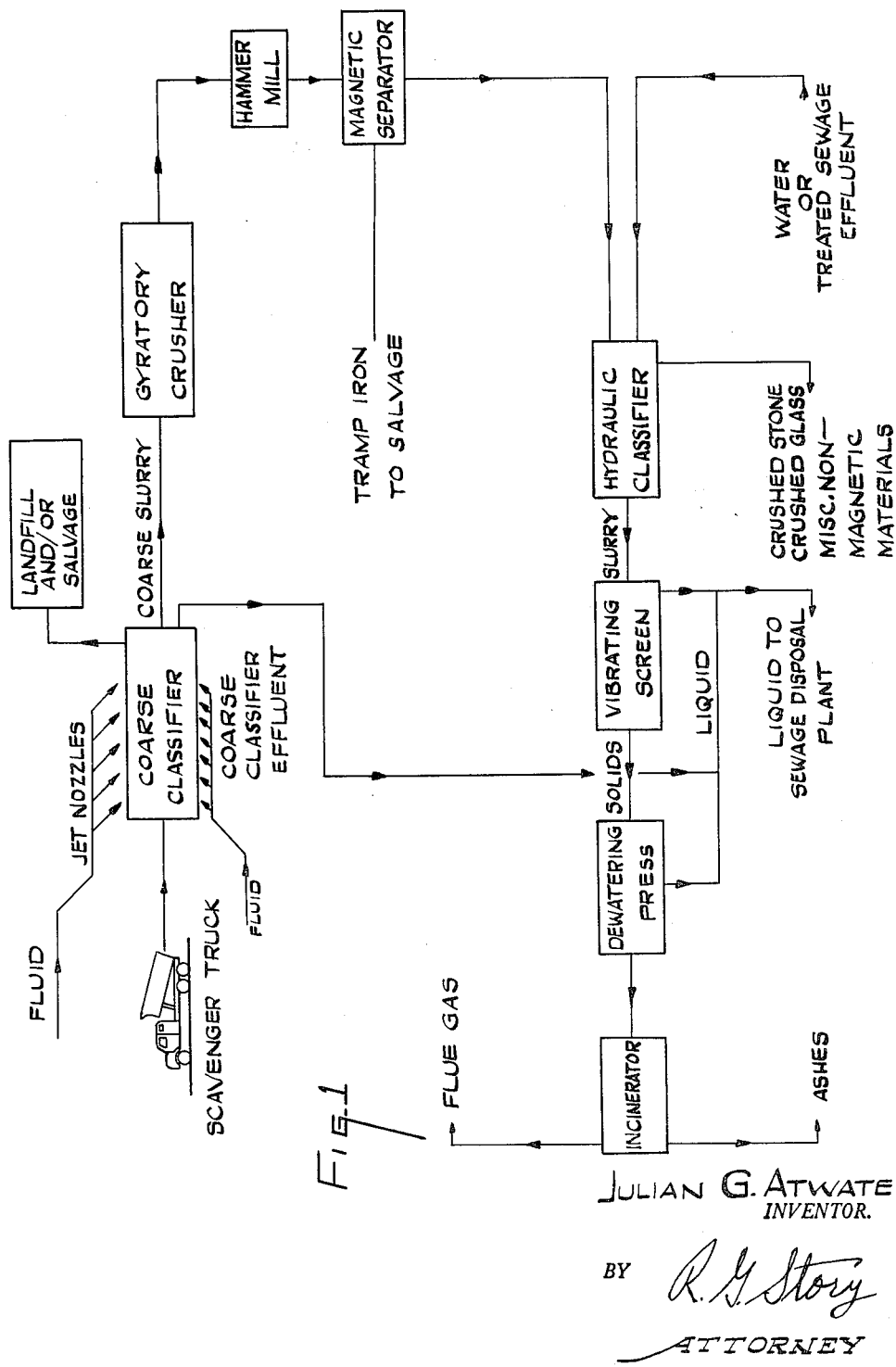

JULIAN G. ATWATER
INVENTOR.

United States Patent Office 3,159,353
Patented Dec. 1, 1964

3,159,353
WASTE DISPOSAL
Julian G. Atwater, Chicago Heights, Ill., assignor to Swift & Company, Chicago, Ill., a corporation of Illinois
Filed Aug. 17, 1961, Ser. No. 132,091
10 Claims. (Cl. 241—39)

This invention relates to the treatment of rubbish, and more particularly to an apparatus for the coarse classification of heterogeneous mixtures of rubbish, and a continuous method of classifying and disposing thereof.

The disposal of trash and garbage is a constantly growing problem. Known means of waste disposal are becoming outmoded, due to an increasing population, decreasing availability of suitable disposal areas, increasing hauling costs, and stricter nuisance abatement laws. The result is that homeowners and industries are finding it necessary to go through the troublesome and expensive process of trash-sorting before their refuse can be disposed of. The waste disposal systems previously proposed for solving the above problem have proved inadequate. Where hydraulic systems have been used for classifying waste material, the material has been classified according to density. However, the disposal of the waste after classification became even more perplexing than it was prior to classification. Those hydraulic classifiers effected no separation in relation to the means to be used in the disposal of the articles. Screen-type refuse classifiers have also been proposed. It can readily be seen that this type of classifier segregated refuse only according to size and again did not aid in the classification of mixtures of diverse types of rubbish into forms in which the rubbish could be readily disposed of.

It is highly desirable to classify heterogeneous mixtures of rubbish in such a manner that large substantial articles such as boulders, planks, tree limbs, and the like, which can be reclaimed or used effectively as land fill, are completely segregated from large but less substantial articles such as paper and wooden boxes, grocery bags and the like, which have a very limited value as land fill in their normal form. These latter articles are more effectively disposed of in the form of ashes and, therefore, should be classified with the smaller articles of rubbish, which are to be burned.

Thus it can readily be seen that methods previously proposed for the disposal of waste material were limited in that only certain types of material could be handled. In order for heterogeneous mixtures of rubbish to be disposed of by these methods, segregation of the rubbish into relatively homogeneous portions prior to the use of these methods of disposal was necessary. Prior to the present invention, it was virtually impossible to take such heterogeneous mixtures of waste material, as can be handled by the instant method, directly from a collection truck and reduce them to ashes and other types of land fill and dispose of them as such, automatically. The heterogeneous mixtures of rubbish contemplated in the instant invention may include, for example, tree limbs, planks, boulders, bricks, small animals removed from streets, cardboard cartons, tin cans, glass bottles, paper bags, small stones, metal articles, vegetable trimmings, fat, bones—in short any animal, vegetable, and mineral materials which it is commonly necessary to dispose of. Mixtures of the above waste material and other similar mixtures are called "rubbish" in this disclosure and the appended claims.

The instant method of waste disposal makes it possible to dispose of these heterogeneous mixtures of rubbish in the form of land fill, ashes, and sewage. The land fill component is made up of such articles as tree limbs, boulders, planks, bricks, small rocks, glass, and metal articles. All smaller burnables are segregated by the instant method and incinerated to reduce them to ashes. Such materials as grease, papier-mâché, liquids, and other similar liquid soluble or liquid suspendable materials are disposed of as sewage. The instant apparatus for the coarse classification of rubbish is used to separate the heterogeneous rubbish into three components: large substantial articles, such as tree limbs and boulders, which make up a major portion of the land fill component; screenables, which are comprised of the smaller burnables and a minor portion of the land fill component which is made up of articles such as bricks, small stones, glass, and pieces of metal; and a sewage component which is comprised of liquid refuse, water soluble materials, and small, water suspendable materials.

It is therefore a primary object of the present invention to provide an improved method and apparatus for the coarse classification and disposal of rubbish.

Another object of this invention is to provide an improved process for the classification and disposal of heterogeneous mixtures of rubbish.

A further object of this invention is to provide an improved apparatus for the continuous classification of heterogeneous mixtures of rubbish into land fill, screenables, and sewage components.

Still another object of this invention is to provide an improved process whereby heterogeneous mixtures of rubbish may be continuously disposed of as land fill, ashes, and sewage.

It is still another object of this invention to provide a process of classifying rubbish by breaking up large but fragile portions of the heterogeneous mixtures of rubbish during the coarse classification of the rubbish so that these portions may be disposed of with the smaller pieces of rubbish rather than with the large substantial pieces of rubbish.

Additional objects and advantages of the present invention will be readily apparent to one skilled in the art from the following detailed description taken in conjunction with the drawings.

In accordance with our invention, the rubbish to be classified and disposed of in the form of land fill, ashes, and sewage is introduced into a tank which has a flowing stream of liquid therein. The larger pieces of rubbish are maintained above said flowing stream on conveying means, which move the rubbish toward the downstream end of the tank. The larger pieces of rubbish, which are maintained on the conveying means, are subjected to high velocity jets of fluid produced by fluid emitting means. The fluid is supplied to the emitting means at a high pressure by a pump or other suitable apparatus. The less substantial pieces of rubbish are broken up by these jets of fluid, and these broken pieces together with the smaller pieces of rubbish are forced through openings in the conveying means and into the flowing stream. The large substantial pieces of rubbish, which are not broken up by the fluid jets, are maintained on the conveying means and are removed from said conveying means in a substantially clean condition, at a point downstream from the point where the rubbish is introduced onto the conveyor, by discharging means.

The pieces of rubbish which fall into the flowing stream are carried toward the downstream end of the tank by the flowing stream. The screenables, i.e., the pieces of rubbish larger than a predetermined size are separated from the suspended sewage materials by separating means. The sewage materials which are suspended in the flowing stream are removed from the tank by disposal means at the downstream end of the tank. That rubbish which is separated from the sewage by the separating means is removed from the stream and conveyed to a disintegrating apparatus where it is reduced in size. The magnetic material and high density non-magnetic material is then removed from the comminuted rubbish. The liquid content of the remaining rubbish is then reduced and this portion of the rubbish is incinerated. The magnetic and high density material rather than being removed may be subjected to incineration with the remainder of the comminuted rubbish.

Figure 2:
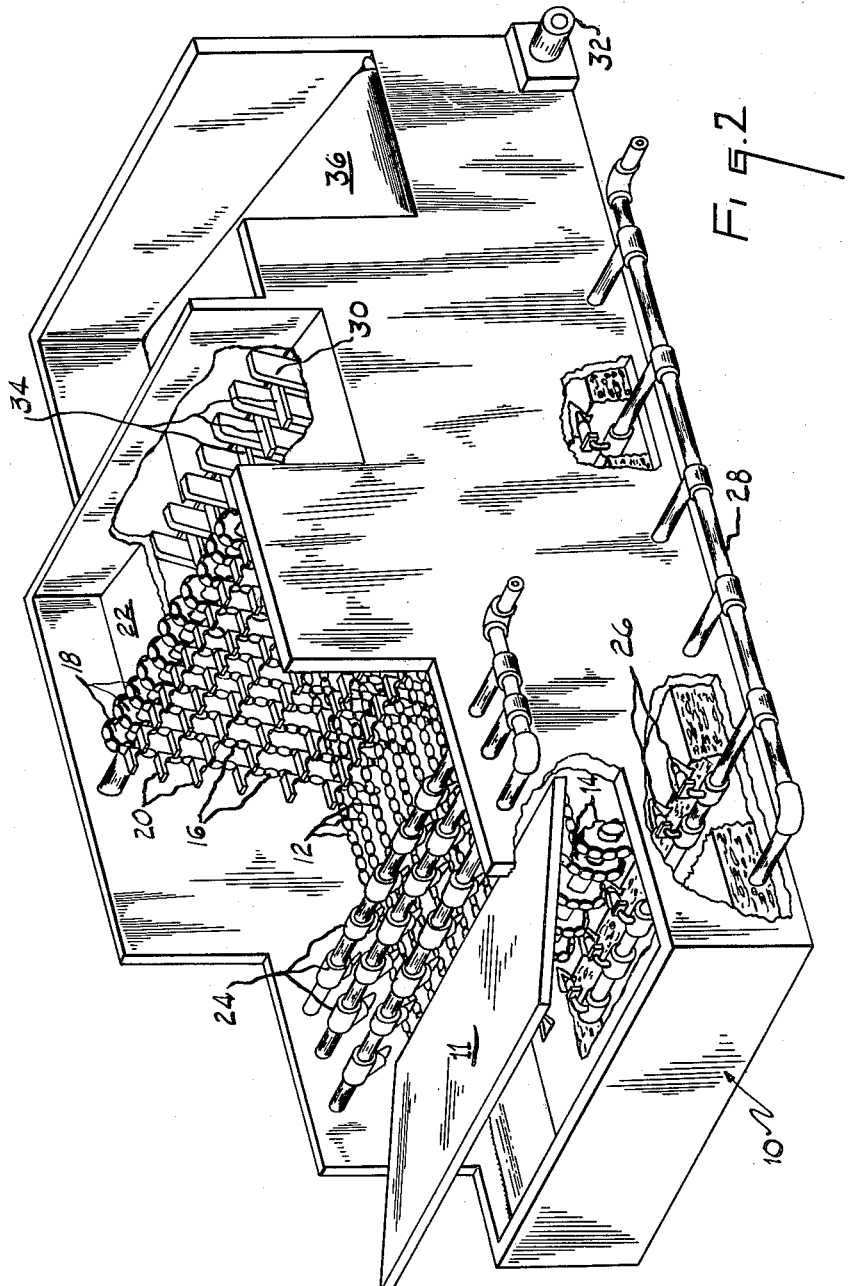

In the drawings:

FIGURE 1 is a flow sheet of a process for the continuous disposal of waste material in accordance with the present invention; and FIGURE 2 is a perspective view with parts broken away of the apparatus for the continuous classification of heterogeneous mixtures of rubbish.

The process for the continuous disposal of heterogeneous mixtures of rubbish by reducing the rubbish to land fill, ashes, and sewage is illustrated diagrammatically in FIGURE 1. A heterogeneous mixture of rubbish is dumped directly from the collection (scavenger) truck onto the receiving ramp of a coarse classifier, described more fully hereinafter. High velocity fluid jets break up the fragile pieces of the rubbish, and force the broken pieces into a violently flowing stream of liquid maintained in the classifier. The fragile and broken pieces of the rubbish together with the smaller pieces of rubbish which also fall into this body of liquid are removed from the coarse classifier in the form of a coarse slurry. This portion of the rubbish is thereby separated from the sewage component which is retained in the liquid stream and flows out of the tank at its downstream end. Large articles of substantial construction such as planks, tree limbs, and boulders, are segregated from the small articles and the broken pieces of large but fragile articles of trash which make up the slurry. The large articles are removed from the coarse classifier in a substantially clean condition, due to the action of the fluid jets, and may either be reclaimed or used for land fill.

It is to be understood that where I refer to a fluid or liquid herein, water is preferred. However, since pure or clean water is relatively scarce in many localities it should be noted that other aqueous fluids such as treated or partially treated sewage effluent or waste waters containing impurities from manufacturing operations may also be used throughout the method and apparatus. Furthermore a large portion of the liquid employed may obviously be coarse filtered and recirculated to advantage.

The slurry from the coarse classifier is then preferably subjected to plural operations to reduce the size of pieces of rubbish therein. The material is desirably first broken further and then the broken pieces further reduced or disintegrated. The resultant slurry containing the disintegrated material is subsequently magnetically treated to remove tramp iron, such as tin cans, coat hangers and the like. The tramp iron removed from the slurry in the magnetic separator is salvaged and may be sold for re-use or used as land fill. The remainder of the slurry is hydraulically classified whereby pulpy material is separated from glass, stones, and other relatively high density nonmagnetic material. Again, either water or treated sewage effluent may be used in the hydraulic classification to separate the disintegrated material in the slurry according to specific gravity. The crushed glass, stones and like material removed from the slurry by hydraulic classification may be disposed of as land fill.

The remaining slurry of pulpy material is preferably dewatered by one or more steps such as agitated draining and/or pressing. The solids separated thereby are preferably burned; and the resulting ashes may be used for land fill or other purposes. (Incineration may oftentimes be carried out without preliminary disintegration and separation steps.)

The transportation of the slurry between the various units used in the above process may be carried out with endless belt conveyors or any other suitable apparatus.

A preferred embodiment of the coarse classifier apparatus is illustrated in FIGURE 2. This embodiment consists of a large rectangular tank generally 10, having rubbish receiving ramp 11 at one end thereof, and transversed horizontally by tightly stretched runs of endless parallel chains 12 mounted on sprockets 14. The endless parallel chains 12 are driven by suitable means, not shown, which also powers a second set of endless chains 16 mounted on sprockets 18. The second chains comprise a discharge means, having a plurality of spaced lifting elements 20, and are trained to move upwardly from about the end of the endless parallel chains 12 to a discharge ramp 22.

Mounted above the endless parallel chains 12 are jet nozzles 24, which are aimed downwardly and slightly toward the downstream end of tank 10.

A plurality of scouring jet nozzles 26 are positioned in the bottom of tank 10 in a series of rows supplied with fluid through a manifold pipe 28. Each row is provided with a number of jets, the first row near the receiving end of the tank and the last row located a predetermined distance in front of a bar screen 30. The scouring jet nozzles discharge liquid at a high velocity in a direction away from the receiving end of tank 10. The liquid is supplied to the nozzle jets 26 continuously through the pipe 28 while liquid is also continuously discharged from tank 10 through an outlet pipe 32, located at the downstream end of tank 10 and beyond a bar screen 30. The bar screen is positioned across the entire width of tank 10 at a predetermined distance from the receiving end of the tank. A rake 34 positioned upon bar screen 30 and driven vertically thereabout by an endless belt, not shown, engages the refuse accumulated by bar screen 30 and deposits it on a slurry conveyor 36, located behind bar screen 30. Slurry conveyor 36 then removes the material from tank 10.

It is readily apparent that receptacles of other shapes could be substituted for the rectangular tank 10 disclosed in the preferred embodiment of this invention as shown in FIGURE 2, and that other suitable conveying means could be substituted for the parallel endless chains disclosed herein.

In operation, a collection truck or the like deposits its heterogeneous load on inclined ramp 11 from which the rubbish slides onto the moving endless parallel chains 12. The moving chains carry the mass of rubbish away from the ramp 11 and beneath the powerful streams of water or other suitable fluid which are emitted from jet nozzles 24. Cans, bottles and other small objects fall between the chains which are spaced a sufficient horizontal distance apart to support only the larger pieces of rubbish, and into the tank. Soft masses such as paper boxes and bags, and wooden boxes of flimsy construction are ruptured or broken into small pieces by the high velocity streams of water from jet nozzles 24 and fall or are rammed through the chains and into tank 10 by the powerful fluid streams.

Large articles such as planks, boulders, and boxes of good construction are not broken up by the jets of fluid and remain on chains 12 and are transported to the downstream end of tank 10. At a predetermined distance from the rubbish receiving end of tank 10, the material remaining on chains 12 is received by the lifting elements 20 of the discharge means and carried up to and deposited on the discharge ramp 22. The land fill component, comprising wooden boxes, tree limbs, boulders, planks, and the like, is discharged from ramp 22, in a substantially clean condition due to the action of the water from jet nozzles 24 and may desirably be classified by heavy machinery. The wooden articles of the latter group may be burned in an open bonfire and the boulders and the like used for land fill, or the entire component may be used as land fill without burning.

The articles of rubbish which pass between chains 12 and into the body of liquid contained in tank 10 are urged away from the receiving end of tank 10 by the violently flowing stream action of the liquid in the tank. Since high velocity streams of liquid are being continuously introduced into tank 10 through scouring jet nozzles 26 and the liquid is continuously leaving the tank through liquid outlet pipe 32, there is a swift current flowing toward the downstream end of tank 10.

The bar screen 30 located across the width of tank 10 at a predetermined distance from the rubbish receiving end of the tank checks the flow of the screenable articles of rubbish in the liquid stream. The stream passing through screen 30 and containing only those portions of the rubbish which are soluble, liquid or small and light such as scraps of paper, ashes and the like, flows out of tank 10 through outlet pipe 32.

The screenable rubbish, which is carried away from the rubbish receiving end of tank 10 by the liquid current, is held near bar screen 30 by the force of the liquid flowing downstream. This material is removed from the tank by a rake 34. The rake lifts the screenable rubbish over the bar screen and deposits it on a discharge conveyor 36 from whence it is discharged to disintegrating apparatus such as a gyratory or jaw crusher and a hammer mill, and magnetic separation equipment.

From the foregoing description it will be evident that the present invention provides an apparatus for the effective continuous coarse classification of a heterogeneous mixture of rubbish into a form which may be easily disposed of and a process for the disposal of rubbish, in which a mixture of diverse types of rubbish is classified and disposed of in an effective and economical manner.

Obviously, many modifications and variations of the invention as hereinbefore set forth may be made without departing from the spirit and scope thereof, and therefore only such limitations should be imposed as are indicated in the appended claims.

I claim:

1. A process for the treatment of heterogeneous mixtures of rubbish to reduce said rubbish to land fill screenables, and sewage, said process comprising maintaining a flowing stream of liquid in a tank; supporting rubbish slightly above said flowing stream; continuously projecting liquid jets downwardly into said liquid stream and against said rubbish, whereby the less substantial pieces of the rubbish are broken up and smaller and broken pieces of said rubbish are forced into said stream, thereby separating said smaller and broken pieces from the major portion of the land fill component, made up of the more substantial pieces of rubbish, which will continue to be supported above said stream; removing said major portion of the land fill component from above said stream; separating pieces in said stream larger than a predetermined size from suspended sewage materials in said stream; and removing said separated pieces from said stream.

2. A process for the treatment of heterogeneous mixtures of rubbish to reduce said rubbish to land fill, screenables, and sewage, said process comprising maintaining a violently flowing stream of liquid in a tank; supporting rubbish slightly above said flowing stream; continuously projecting liquid jets of high velocity downwardly into said liquid stream and against said rubbish, whereby the less substantial pieces of the rubbish are broken up and smaller and broken pieces of said rubbish are forced into said stream, thereby separating said smaller and broken pieces from the major portion of the land fill component, made up of the more substantial pieces of rubbish, which will continue to be supported above said stream; removing said major portion of the land fill component from above said stream; separating pieces in said stream larger than a predetermined size from the suspended sewage materials in said stream; and removing the separated pieces from said stream.

3. An apparatus for the continuous classification and disposal of heterogeneous mixtures of rubbish in the form of landfill, screenables, and sewage comprising: means for maintaining a flowing stream of liquid in a tank; means for supporting rubbish slightly above said flowing stream; means for continuously projecting liquid jets downwardly into said liquid stream and against said rubbish, whereby the less substantial pieces of said rubbish are broken up, and the smaller and broken pieces of said rubbish are forced into said stream, thereby separating said smaller and broken pieces from the major portion of the land fill component, made up of the more substantial pieces of rubbish, which will continue to be supported above said stream; means for removing said major portion of the land fill component from above said stream; means for separating pieces of rubbish in said stream larger than a predetermined size from the suspended sewage materials in said stream; and means for removing the separated pieces from said stream.

4. An apparatus for the continuous classification of heterogeneous mixtures of rubbish into land fill, screenables, and sewage components, said apparatus comprising in combination: a tank containing a moving body of liquid, said tank adapted to receive unclassified rubbish at one side thereof; a series of endless parallel chains within said tank extending from said one side, said chains having upper runs positioned slightly above the level of surface of said moving body of liquid, and a sufficient horizontal distance apart to support only the larger pieces of rubbish therebetween; high velocity fluid nozzles located above said parallel endless chains and aimed downwardly at said chains, whereby the less substantial pieces of said rubbish will be broken up by the high velocity fluid streams emitting from said nozzles, and forced between said parallel endless chains and into said body of liquid; discharging means adjacent to said chains and spaced from said one side for removing said larger pieces of rubbish, as land fill, from said chains at a predetermined distance from said one side; a series of scouring nozzles positioned in the bottom of said tank, said scouring nozzles aimed in a direction away from said one side, whereby the fluid emitting from said scouring nozzles urges all rubbish, in said body of liquid, in said direction; a bar screen positioned across said tank at a predetermined distance from said one side, said bar screen checking the flow in said direction of all screenable rubbish while allowing a suspended sewage component to continue its flow; discharge means located in said tank at a distance from said one side greater than said predetermined distance allowing said sewage to pass out of the tank; a rake operatively positioned on said bar screen, said rake removing from said tank the screenables which are accumulated by said bar screen; and driving means associated with said rake for driving said rake, whereby said screenables are removed.

5. An apparatus for the classification of heterogeneous mixtures of rubbish into land fill, screenables, and sewage components, said apparatus comprising in combination: a tank containing a moving body of liquid, said tank adapted to receive unclassified rubbish at one side thereof; a series of endless parallel chains within said tank extending from said one side, the upper runs of said chains positioned slightly above the level of the surface of said moving body of liquid, and spaced a sufficient horizontal distance apart to support only the larger pieces of rubbish therebetween; high velocity fluid nozzles located above said chains, said nozzles aimed downwardly at said chains whereby the high velocity fluid emitting from said nozzles will break up the less substantial pieces of rubbish and force the smaller and broken pieces of rubbish between said chains and beneath the surface of said body of liquid, thereby separating the smaller and broken pieces from the large substantial pieces which are maintained on said chains; discharging means adjacent to said chains and spaced from said one side for removing said large substantial pieces comprising land fill from said chains at a predetermined distance from said one side; and separating means within said tank for removing from said moving body of liquid all screenable rubbish contained therein, thereby leaving only a suspended sewage component in said body of liquid; and disposal means connected to said tank for removing said sewage component therefrom.

6. An apparatus for the classification of heterogeneous mixtures of rubbish into land fill, screenables, and sewage components, said apparatus comprising in combination: a tank containing a violently moving body of liquid, one side of said tank being adapted to receive unclassified rubbish; conveying means within said tank extending from said one side, the conveying surface thereof located slightly above the level of the surface of said moving body of liquid, said conveying means supporting only the larger pieces of said rubbish; high velocity fluid nozzles located above said conveying means, said nozzles aimed downwardly at said conveying means, whereby high velocity jets of fluid emitting from said nozzles will break up the less substantial pieces of rubbish and force the smaller and broken pieces of rubbish through said conveying means and into said body of liquid, thereby separating said smaller and broken pieces from the large substantial pieces which are maintained on said conveying means; discharging means adjacent to said conveying means and spaced from said one side for removing said large pieces comprising land fill from said conveying means; separating means within said tank for removing all screenable rubbish from said moving body of liquid, whereby said liquid contains only a suspended sewage component; and disposal means connected to said tank for removing said sewage component therefrom.

7. An apparatus for the classification of heterogeneous mixtures of rubbish into land fill, screenables, and sewage components, said apparatus comprising in combination: a tank containing a violently moving body of liquid, one side of said tank being adapted to receive unclassified rubbish; conveying means within said tank extending from said one side, the conveying surface thereof located slightly above the level of the surface of said body of liquid, said conveying means supporting only the larger pieces of said rubbish; high velocity fluid nozzles located above said conveying means, said nozzles aimed downwardly at said conveying means, whereby high velocity jets of fluid emitting from said nozzles will break up the less substantial pieces of rubbish, and force the smaller and broken pieces of said rubbish through said conveying means and into said body of liquid, thereby separating said smaller and broken pieces from the large substantial pieces, which are maintained on said conveying means; means for removing said large pieces comprising land fill from said conveying means; a series of scouring nozzles positioned in the bottom of said tank, said scouring nozzles aimed in a direction away from said one side, whereby the fluid emitting from said scouring nozzles urges all rubbish, in said body of liquid, in said direction; a bar screen positioned across said tank at a predetermined distance from said one side, said bar screen checking the flow in said direction of all screenable rubbish; discharge means located in said tank at a distance from said one side greater than said predetermined distance, for allowing the suspended solids comprising the sewage component to pass out of said tank; a rake operatively attached to said bar screen, said rake removing from said body of liquid the screenable rubbish accumulated by said bar screen; and driving means associated with said rake for operating said rake.

8. An apparatus for the classification of heterogeneous mixtures of rubbish into land fill, screenables, and sewage components, said apparatus comprising in combination: a tank containing a moving body of liquid, said tank adapted to receive unclassified rubbish at one side thereof; a series of endless parallel chains within said tank extending from said one side, the upper runs of said chains positioned slightly above the level of the surface of said body of liquid and spaced a sufficient horizontal distance apart to support only the larger pieces of said rubbish therebetween; fluid emitting means located above said parallel endless chains for directing high pressure jets of fluid at the rubbish on said chains, said jets of fluid tending to break up the less substantial pieces of rubbish on said chains and forcing the broken and smaller pieces of rubbish into said body of liquid thereby separating the smaller and broken pieces of rubbish from the larger substantial pieces which are maintained on the chains; discharging means adjacent to said chains and spaced from said one side for removing the large pieces comprising land fill from said parallel endless chains; screening means within said tank for removing screenable rubbish from said moving body of liquid, whereby said liquid contains only a suspended sewage component; and disposal means connected to said tank for removing said sewage therefrom.

9. An apparatus for the classification of heterogeneous mixtures of rubbish into land fill, screenables, and sewage components, said apparatus comprising in combination: a tank containing a violently moving body of liquid, said tank adapted to receive unclassified rubbish at one side thereof; a series of endless parallel chains within said tank extending from said one side, the upper runs of said chains positioned slightly above the level of the surface of said body of liquid and spaced a sufficient horizontal distance apart to support only the larger pieces of said rubbish therebetween; fluid emitting means located above said parallel endless chains for directing high pressure jets of fluid at the rubbish on said chains, said jets of fluid tending to break up the less substantial pieces of rubbish on said chains and forcing the broken and smaller pieces of rubbish into said body of liquid thereby separating the smaller and broken pieces of rubbish from the larger substantial pieces which are maintained on the chains; discharging means adjacent to said chains and spaced from said one side, for removing the large pieces comprising land fill from said parallel endless chains; a series of scouring nozzles positioned in the bottom of said tank, said scouring nozzles aimed in a direction away from said one side, whereby the fluid emitting from said scouring nozzles urges all rubbish, in said body of liquid, in said direction; a bar screen positioned across said tank a predetermined distance from said one side, said bar screen checking the flow in said direction of all screenable rubbish; a disposal means located in said tank at greater than said predetermined distance from said one side for allowing the suspended solids comprising the sewage component to pass out of said tank; a rake operatively attached to said bar screen, said rake removing from said body of liquid the rubbish accumulated by said bar screen; and driving means associated with said rake for causing said rake to remove said rubbish.

10. An apparatus for the classification of heterogeneous mixtures of rubbish into land fill, screenables, and sewage components, said apparatus comprising in combination: a tank containing a moving body of liquid, said tank adapted to receive unclassified rubbish at one side thereof; conveying means within said tank extending from said one side, the conveying surface thereof located slightly above the level of the surface of said moving body of liquid, said conveying means being adapted to support only the larger pieces of said rubbish; fluid emitting means located above said conveying means for directing high pressure jets of fluid at the rubbish on said conveying means, said jets of fluid tending to break up the less substantial pieces of rubbish on said conveying means and forcing the broken and smaller pieces of rubbish through said conveying means and into said body of liquid, thereby separating said broken and smaller pieces from the larger substantial pieces which are maintained on said conveying means, discharging means adjacent to said conveying means and spaced from said one side for removing the large pieces comprising land fill from said conveying means; screening means within said tank for removing screenable rubbish from said body of liquid, whereby said liquid contains only a suspended sewage component; and disposal means connected to said tank for removing said sewage therefrom.

References Cited in the file of this patent

UNITED STATES PATENTS

| | | |
|---|---|---|
| 506,361 | Dowling | Oct. 10, 1893 |
| 1,209,654 | Anderson | Dec. 27, 1916 |
| 1,210,408 | Brockhausen | Jan. 2, 1917 |
| 1,936,810 | Upson | Nov. 28, 1933 |
| 1,947,035 | Covington | Feb. 13, 1934 |
| 2,230,385 | Pecker | Feb. 4, 1941 |
| 2,373,635 | Wuensch | Apr. 10, 1945 |
| 2,380,025 | Chase | July 10, 1945 |
| 2,687,152 | Hansel | Aug. 24, 1954 |